March 16, 1954 J. H. VOSS 2,672,520

TELEPHONE SYSTEM FOR PRIVATE AUTOMATIC BUSINESS EXCHANGES

Filed April 13, 1950 5 Sheets-Sheet 1

FIG. I

INVENTOR.
JOHN H. VOSS

BY

ATTORNEY

March 16, 1954 J. H. VOSS 2,672,520

TELEPHONE SYSTEM FOR PRIVATE AUTOMATIC BUSINESS EXCHANGES

Filed April 13, 1950 5 Sheets-Sheet 2

INVENTOR.
JOHN H. VOSS

BY Chas. W. Candy

ATTORNEY

March 16, 1954 J. H. VOSS 2,672,520

TELEPHONE SYSTEM FOR PRIVATE AUTOMATIC BUSINESS EXCHANGES

Filed April 13, 1950 5 Sheets-Sheet 3

INVENTOR.
JOHN H. VOSS

BY [signature]

ATTORNEY

INVENTOR.
JOHN H. VOSS
BY
Chas. L. Candy
ATTORNEY

March 16, 1954 J. H. VOSS 2,672,520

TELEPHONE SYSTEM FOR PRIVATE AUTOMATIC BUSINESS EXCHANGES

Filed April 13, 1950 5 Sheets-Sheet 5

INVENTOR.
JOHN H. VOSS
BY
Chas. W. Candy
ATTORNEY

Patented Mar. 16, 1954 2,672,520

UNITED STATES PATENT OFFICE 2,672,520

TELEPHONE SYSTEM FOR PRIVATE AUTOMATIC BUSINESS EXCHANGES

John H. Voss, Rochester, N. Y., assignor to Automatic Electric Laboratories, Inc., Chicago, Ill., a corporation of Delaware Application April 13, 1950, Serial No. 155,626

12 Claims. (Cl. 179—18)

The present invention relates in general to telephone systems, and more particularly to systems of the type commonly known as the private automatic telephone exchanges.

Private automatic telephone exchanges are installed in business and other establishments for providing local services between a relatively small number of local telephone stations, and for completing connections between the local telephone stations and another telephone exchange over trunk lines.

An object of the invention is to provide novel circuits in an automatic telephone exchange of the foregoing character for accomplishing the various telephone connections in a simple and efficient manner.

Another object of the invention is to provide an economically arranged private automatic telephone exchange wherein the minimum amount of switching equipment is required to enable a local telephone station to connect with a particular trunk line extending to another telephone exchange, and which can be manufactured very inexpensively, without sacrificing the desirable service facilities usually provided in more costly types of private exchanges.

A feature of the present invention is that the circuit employs a 13-relay register arrangement in which the tens digit is registered on the last five register relays, and the units digit is registered on the first five register relays. Three relays operate in conjunction with the other ten relays for controlling the complete registration of the called number. Another relay is provided to lock the operated register relay of the tens group.

The various objects and features of the invention will be understood best from a perusal of the following detail description of the drawing comprising Figs. 1–5, inclusive, which show a diagrammatic representation of the present invention and include a sufficient amount of apparatus to enable the invention to be described and understood.

Figure 1:
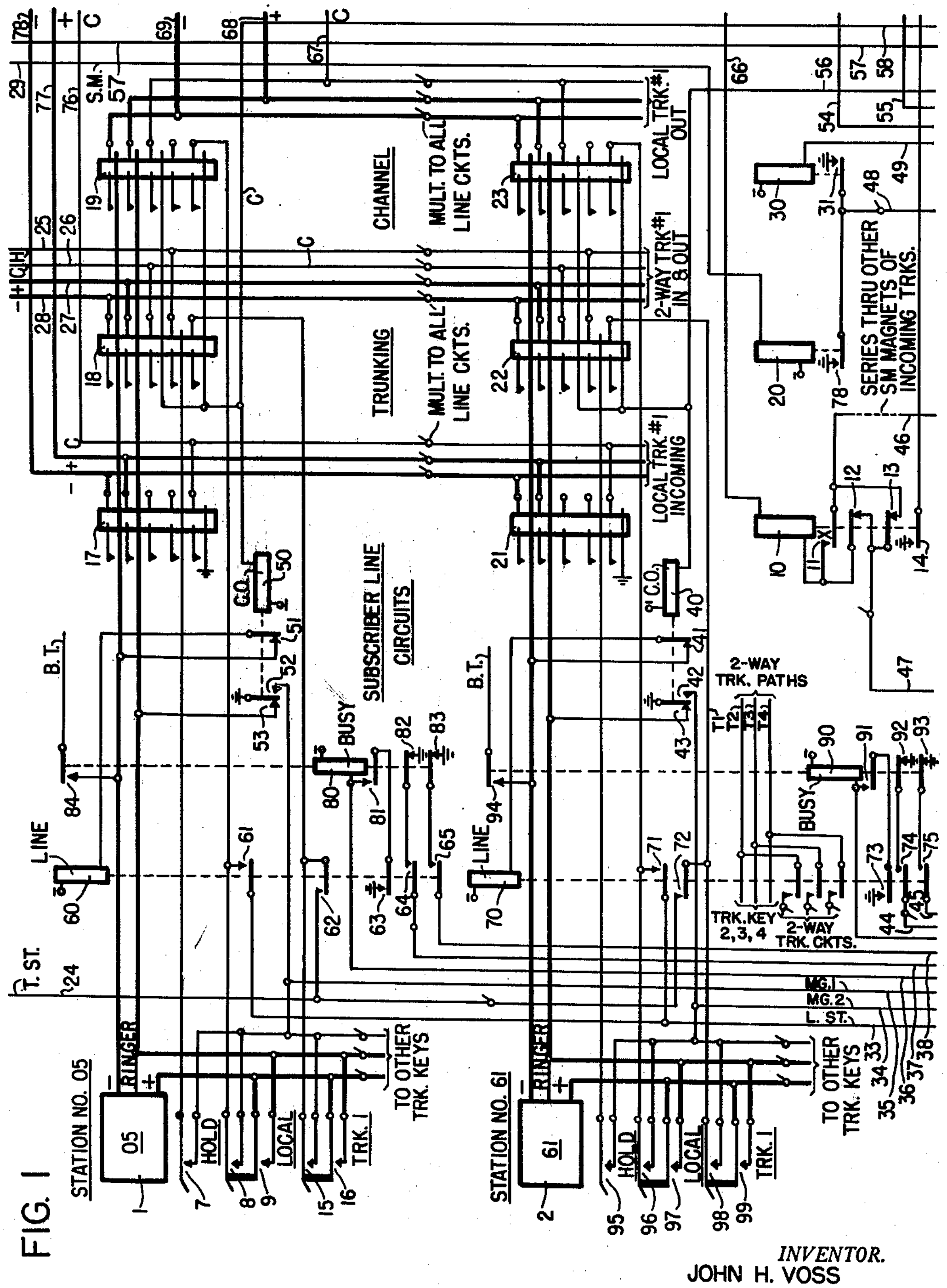
Fig. 1 illustrates the substation circuits and cross-bar switch for establishing connections locally and over central office trunks.

Referring now to Fig. 1, all local stations, such as stations #05 and #61, are each equipped with a standard well-known automatic telephone instrument comprising a cradle type receiver and transmitter handset, a cradle switch and associated contact springs, an inductance coil and a ringer. Since the arrangement of these components and the inter-wiring of the same are well-known, no detail circuit diagrams of the instruments are included in Fig. 1. The instruments at stations #05 and #61 are represented by block diagrams 1 and 2, respectively.

Associated with each telephone instrument is a set of interlocking push buttons mechanically interlocked with each other and with the cradle switch in a manner similar to that disclosed in Patent No. 1,783,310 issued on December 2, 1930, to N. H. Saunders et al. Each station telephone instrument is fitted with a local call line connecting key switch, a trunk line holding key, and an individual connecting key switch for each trunk line. Only the connecting key switch for trunk line 1 for each station is shown for purposes of simplicity.

The substation line circuits are shown in the center of Fig. 1. Each line circuit is individually associated with a subscriber's substation.

Each local station terminates in a cross-bar switch of the type well-known in the art. The cross-bar switch may be of the type shown in Patent No. 1,953,503, issued on April 3, 1934, to J. N. Reynolds. The cross-bar switch is used as the means for establishing connections locally and over the central office trunks. Each trunk circuit is controlled individually by a selecting magnet such as selecting magnets 10, 20 and 30. The trunking channel is shown in the vertical position. Included within each line circuit is a cut-off relay, such as 40 and 50, for linking a station connection to a trunk line. The line circuits are shown in the horizontal position. When one of the selecting magnets is operated, fingers controlled by a vertical bar individually associated with a trunk channel are positioned behind spring contact connections. The subsequent operation of one of the cut-off relays operates a horizontal bar which moves the fingers at the intersection of the two bars to establish an electrical connection between the associated spring contacts. Therefore, when a selecting magnet is operated subsequent to the maintained operation of a cut-off relay no electrical connection is established thereby.

For purposes of simplicity only one two-way trunk channel and one pair of local trunk channels are shown. To utilize four two-way trunk channels, trunk channels and selecting magnets similar to that shown may be added. Likewise, only trunk channels for connecting a local call to link #1 is shown for purposes of simplicity. To utilize three local links, six trunk channels and six selecting magnets may be added in a manner similar to that shown. Three trunk channels would then be used for the incoming channel and three for the outgoing channels.

Figure 2:
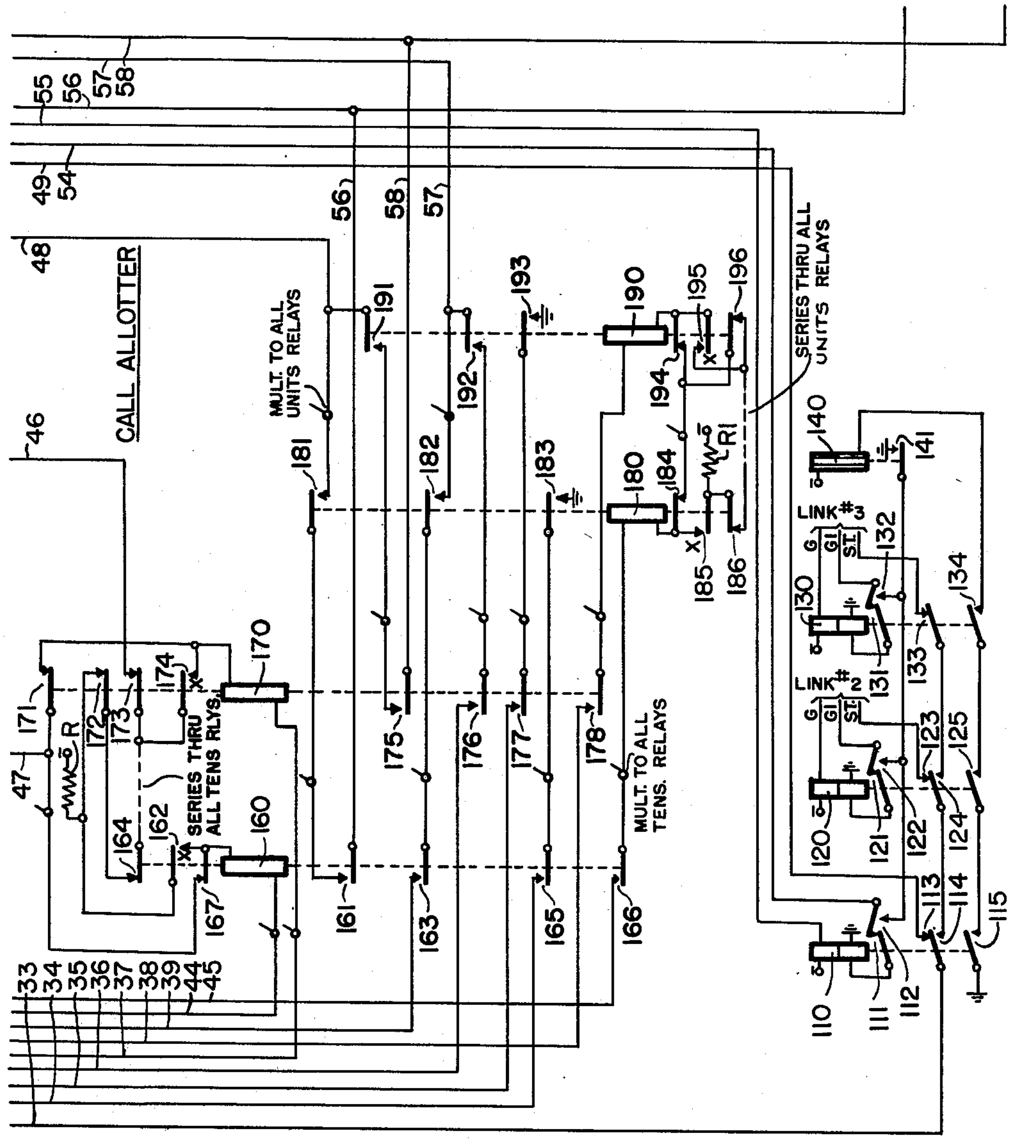
Fig. 2 illustrates the call allotter circuit.
Figure 3:
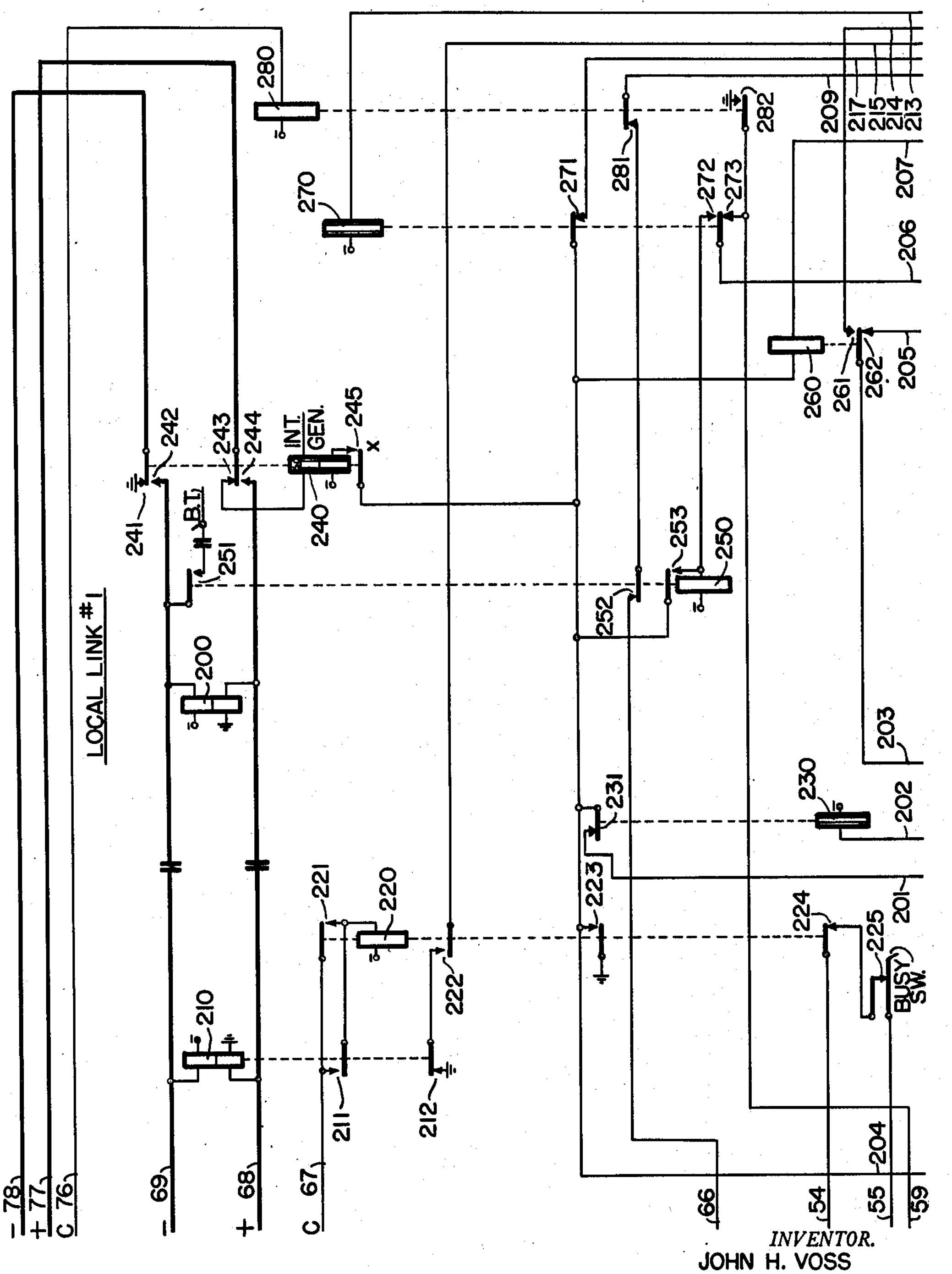
Fig. 3 illustrates the local link circuit.

The relay type call allotter illustrated in Fig. 2 may be of the type disclosed in Patent No. 2,486,231, issued on October 25, 1949, to the present inventor, which permits one initiated call from the local stations to be registered at a time for extension to a local interconnecting call or to a distant-exchange trunk line. The three local interconnecting links, similar to that shown in Fig. 3, are pre-selected in numerical sequence in a manner well-known in conventional all-relay systems. The tens relay 160 is associated with local station #61 as well as with other stations having the tens digit 6 and the tens relay 170 is associated with the local station #05 as well as with other stations having the tens digit 0. Tens relays for the other stations in the other tens groups would be connected in a similar manner. The units relay 180 is associated with local station #61 and all other stations having the same units designation, and units relay 190 is associated with local station #05 and all other stations having the same units designation. Units relays for the other stations having different units designations would be connected in a similar manner. The energizing circuits for the tens relays and the units relays are each chained in series circuits through the respective relays for preventing more than one tens relay and one units relay from operating at one time. Hence, a second local station cannot be connected with a local link or a trunk line while another local station is being connected with a local link.

The local interconnecting links are pre-assigned in numerical sequence by means of the call allotter relays 110, 120 and 130 operating in a cyclic manner well-known in the art. The allotter relays are shown in the normally operated position indicative of the idle condition of their associated links. Relay 110 is associated with link #1, relay 120 is associated with link #2, relay 130 is associated with link #3, and relay 140 is common to relays 110, 120 and 130.

Referring now to Fig. 3 which illustrates the circuit for local link #1. Three local links may be used which are similar to the one shown in Fig. 3. Each local link is permanently wired to two separate trunks of the cross-bar switch circuits, one of these two trunks permitting a calling station to connect with the link, and the other trunk enabling the calling local station to connect with the desired local station through the link.

Figure 4:
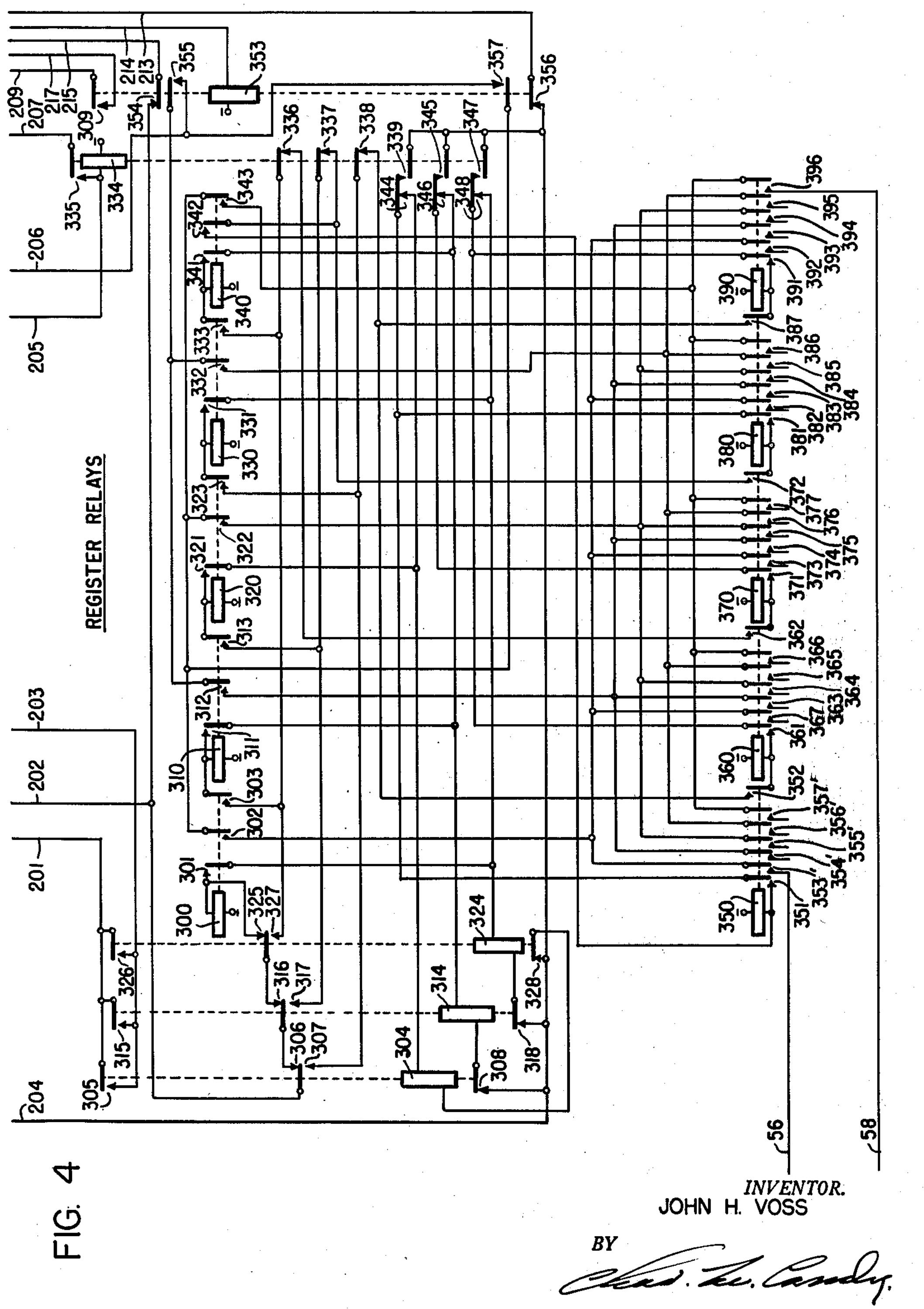
Fig. 4 illustrates the register relay arrangement.

It is to be noted that the system herein disclosed provides a 25 line P. A. B. X system, in which two digits are registered. Referring now to Fig. 4, which illustrates a 13 relay register circuit, which has been arranged so that the first digit is registered in the last five counting relays 350, 360, 370, 380 and 390. The second digit is registered in the first five counting relays 300, 310, 320, 330 and 340. Relays 350–390 represent tens digits 6–0, respectively. Relays 300–340 represent units digits 1–5, respectively. Therefore, the subscriber line numbers are 61–65, 71–75, 81–85, 91–95, 01–05.

Each group of register relays is individually associated with a link circuit. The circuit employs three switching relays operating in conjunction with the ten counting relays for controlling the complete registration of the called number. In addition thereto, another relay is provided to lock the operated tens digit counting relay. The operated units counting relay is locked in series with one of the three switching relays.

Figures 5, 6:
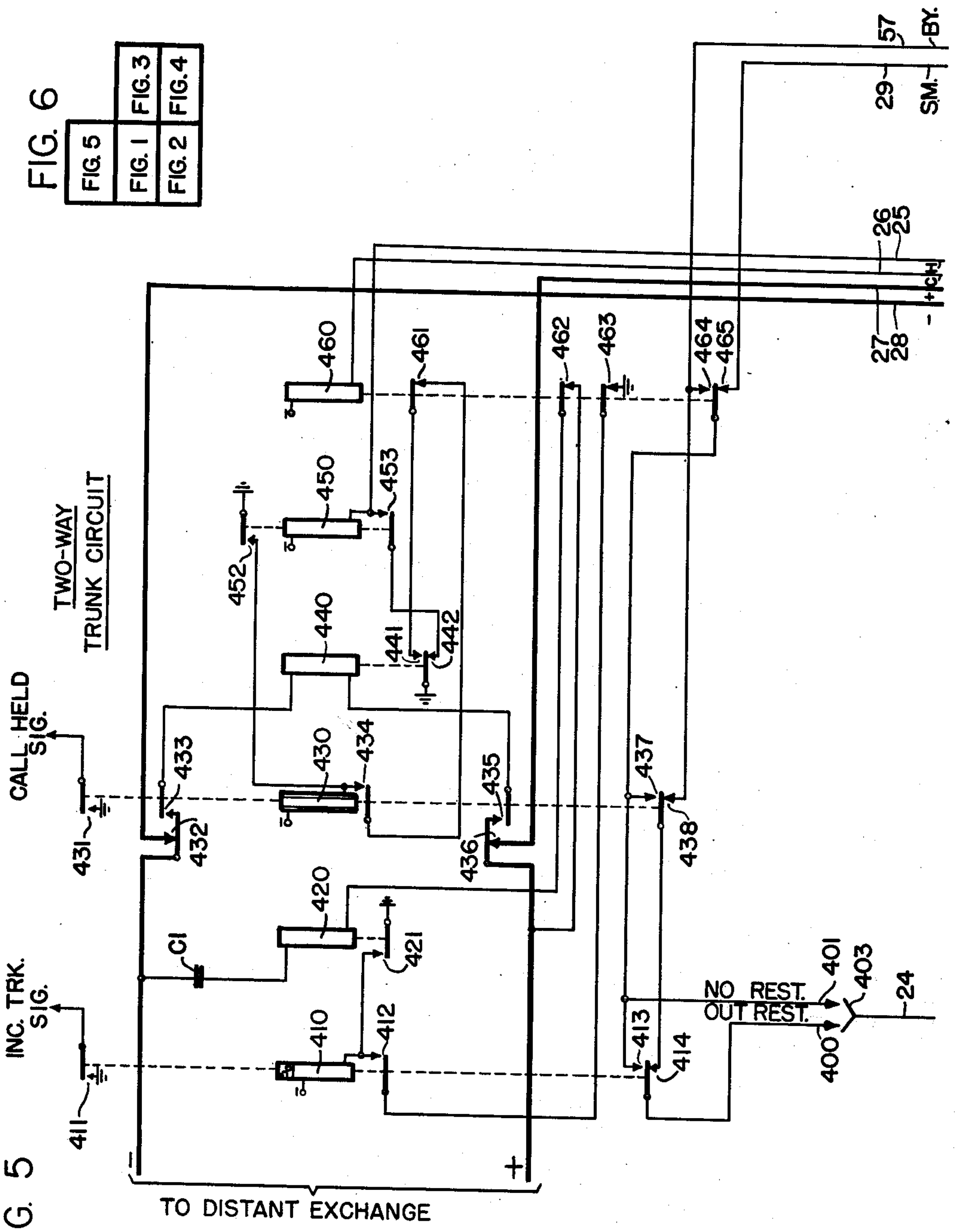
Fig. 5 illustrates the two-way trunk circuit.
Fig. 6 shows the positions of the respective figures for illustrating the invention.

Referring now to Fig. 5, which illustrates the circuit arrangement of the two-way trunk circuit #1. Each two-way trunk circuit is interwired with an associated trunk channel of the cross-bar switch and each two-way trunk circuit is extended to a distant exchange. The selection of the two-way trunk circuit may be done in a manner similar to that shown for the selection of a local link circuit. Four two-way trunk circuits may be used and all are similar to the one shown in Fig. 5. Two types of service are permitted for the two-way trunk channel, namely, "no restriction" and "out restriction." In no restriction, the station can be a party to both incoming and outgoing calls over the two-way trunk channel; whereas with the out restriction, the station can receive incoming calls, but cannot make outgoing calls. For the service desired, a connection is made to junction 403 by either of the terminals 400—401 depending upon the type of service selected.

The invention having been described generally, a detailed description of the operation of the equipment will now be given. For this purpose, it will be assumed that the call allotter shown in Fig. 2 has pre-assigned local interconnecting link #1 and that there are no local or trunk calls in progress. Under these conditions of operation, the equipment is in the position shown in the drawing.

*Local calls*

Briefly described, the subscriber at the calling station lifts the handset from the cradle of the telephone and depresses the local connecting key, shown in Fig. 1, into the operated position where it locks mechanically. The line circuit of the calling subscriber operates the call allotter, shown in Fig. 2. The call allotter thereupon operates the selecting magnet of the cross-bar switch, shown in Fig. 1, associated with the pre-selected channel to the local link. The call allotter element selects an idle local link in a sequential order. Subsequently, the cut-off relay of the calling line circuit operates to complete an electrical connection from the calling line circuit to the local link through the local outgoing trunk channel of the cross-bar switch. Thereupon the call allotter is released. Dial tone is sent back to the calling party. The telephone number of the desired called local station is dialed by the calling party to operate the local link, shown in Fig. 3. As a result thereof, the register relays of the counting chain, shown in Fig. 4 are operated. The selecting magnet of the local incoming channel trunk associated with the heretofore selected local link operates. Subsequently the cut-off relay of the called local station operates to complete the electrical connection from the called line circuit to the local link through the local incoming trunk channel of the cross-bar switch. The release of the connection is under the control of the calling party In order to describe a local call in detail, it will be assumed that station #61 desires to call station #05. Responsive to the lifting of the handset, not shown, and the subsequent depressing of the local connecting key at station #61, line relay 70 operates over the following path: battery, relay 70, contacts 41, over the line loop, through the substation instrument 2, contacts 97, contacts 43 and ground. Contacts 97 and 96 made when the local line connecting key was depressed.

Line relay 70 operates and contacts 71 prepare a circuit from the local start conductor 33. Contacts 72 prepare a circuit to the two-way trunk channel. Contacts 73 prepare a locking circuit to the busy relay 90. Contacts 74 complete a circuit to operate relay 160 representing the tens digit (6), contacts 75 prepare a circuit to operate the units digit (1) relay 180. Tens digit relay 160 of the call allotter operates over the following path; ground, contacts 92, contacts 74, conductor 44, relay 160, contacts 167, conductor 47, contacts 13, conductor 46, contacts 173, contacts 164, contacts 172 and resistance R to battery. Relay 160 represents the tens digit 6 and is common to all lines having a tens digit 6 in their telephone numbers.

Relay 160 operates and contacts 164 open the series through connection to all tens relays. "X" contacts 162 makes first and complete a locking circuit for relay 160 before contacts 164 are opened over the following path: ground. contacts 92, contacts 74, conductor 44, relay 160, contacts 162, and resistance R to battery. Contacts 167 open the original energizing circuit of relay 160 after the closure of its locking circuit and open an operating circuit to selecting magnet 10 of the local incoming trunk channel, and contacts 161 prepare an operating circuit to cut-off relay 40. Contacts 163 close to prepare a circuit to the two-way trunk busy lead. Contacts 165 close to prepare a ground connection to the M. G. lead of the calling line, shown as conductor 34. Contacts 166 close to operate the unit digit (1) relay 180 of the call allotter. Unit digit (1) relay 180 of the call allotter is associated with the station #61 and all other stations having the same units digit.

Relay 180 operates over the following path: ground, contacts 93, contacts 75, conductor 45, contacts 166, relay 180, contacts 184, contacts 196, series connection thfrough all unit relays, contacts 186 and resistance R1 to battery. Contacts 181 make to further prepare an operating circuit to the cut-off relay 40 of the calling line. Contacts 182 further prepare the busy connection to the two-way trunk circuit. Contacts 183 make to ground the M. G. lead of the calling party over the following path: ground, contacts 183, contacts 165 and conductor 34. Contacts 184 break to open the multiple connection to other unit relays. Contacts 186 break to open the series through connection to other unit relays. "X" contacts 185 make first and complete a locking circuit for relay 180 over the following path: battery, resistance R1, contacts 185, relay 180, contacts 166, conductor 45, contacts 75 and 93, and ground.

Ground on the M. G. lead operates the selecting magnet 30 of the local outgoing trunk of the selector switch over the following path: ground, contacts 183, contacts 165, conductor 34, contacts 96, contacts 71, conductor 33, contacts 113, conductor 49, selecting magnet 30 and battery.

At this point, it is necessary to digress to explain the operation of the call allotter. The local interconnecting links are pre-assigned in numerical sequence by means of the call allotter relays 110, 120 and 130 operating in a cyclic manner well-known in the all relay systems. Relay 110 is associated with link #1, relay 120 with link #2, and relay 130 with link #3, and relay 140 is common to relays 120, 130 and 110. When all four relays are at normal position, the circuit to relay 140 is completed over the following path: battery, relay 140, contacts 134, contacts 125, contacts 115 and ground. Relay 140 operates and contacts 141 make to operate relay 110 if the first local link is idle over the following path: ground, contacts 141, contacts 112, conductor 54, contacts 224, busy switch contacts 225, conductor 55, relay 110 and battery. Relay 110 operates and locks itself over the following path: ground, lower winding of relay 110, contacts 111, conductor 54, contacts 224, busy switch contacts 225, conductor 55, upper winding of relay 110 and battery. Contacts 115 break to release relay 140. Contacts 113 make to prepare the circuit to the select magnet 30 of the outgoing local channel trunk associated with with local link #1. In a like manner to that just described for operation and locking of relay 110, relay 140 also causes relays 120 and 130 to operate and lock. At contacts 123 relay 120 closes a point to a selecting magnet associated with link #2; and at contacts 133, relay 130 similarly closes a point in the circuit to a selecting magnet associated with link #3. It is obvious that the start lead to the link selecting magnets extending through contacts of relay 120 of link #2 cannot be extended to operate the selecting magnet associated with link #2 until the relay 110 restores. Relay 130 of link #3 cannot extend the start lead to the link selecting magnets to operate the selecting magnet associated with link 3 until the relays 110 and 120 are restored. Relay 110 is restored when link #1 is seized and contacts 224 are opened by relay 220 of the local link #1. Relay 110 thereupon extends a connection to the selecting magnet associated with link #2, thereby preassigning link #2. In a similar manner relay 120 on restoring extends a connection to the selecting magnet associated with link #3. With relays 110, 120 and 130 restored, relay 140 operates to cause the re-operation of relays 110, 120 and 130 in a manner heretofore explained and link #1 is again pre-assigned.

Returning now to the call outgoing at local station 61, with the selecting magnet 30 operated, a vertical bar places mechanical obstruction fingers in position to operate corresponding electrical contacts in a manner disclosed in the aforementioned Patent #1,953,503. At the same time contacts 31 complete a circuit for operating the cut-off relay 40 of the local station.

Relay 40 operates over the folowing path: ground, contacts 31, conductor 48, contacts 181, contacts 161, conductor 56, relay 40 and battery. Cut-off relay 40 operates a horizontal bar which engages the corresponding position mechanical obstruction fingers to cause the electrical contacts at terminal strip 23 to close in a manner disclosed in the aforementioned Reynolds Patent #1,953,503. The electrical connections established at terminal strip 23 complete the circuits from the substation 61 to the selected trunk channel of outgoing local link #1.

In response to cut-off relay 40 operating, contacts 42 make to lock relay 40 through the local key of substation 61 over the following path: battery, relay 40, lower contact of terminal strip 23, contacts 96, contacts 42 and ground. Contacts 43 and 41 break to release the line relay 70 over a path previously described for operating the same.

Relay 70 releases thereby releasing relay 160 at contacts 74 over a path previously described for operating the same, and further releasing relay 180 at contacts 75 over a path previously described for operating the same. Relays 160 and 180 releasing releases selecting magnet 30 at contacts 165 and 183 over a path previously described for operating the same. The releasing of relays 160 and 180 and the selecting magnet 30 enables a call from another line to be initiated.

After the cut-off relay 40 operated and electrical connections were established from the substation 61 through the cross-bar switch at the terminal strip 23, relay 210 of local link #1 operated over the following path: battery, upper winding of relay 210, conductor 69, upper contacts on terminal strip 23, line loop circuit of substation 61 including key contacts 97, contacts on terminal strip 23, conductor 68, lower winding of relay 210 and ground. Relay 210 operates and contacts 211 make to operate relay 220. The removal of ground from contacts 212 have no present effect on the operation.

Relay 220 operates over the following path: battery, relay 220, contacts 211, conductor 67, the third and bottom contacts on terminal strip 23, key contacts 96, contacts 42 and ground. Contacts 221 make a lock relay 220, independent of line relay 210, over a path heretofore described for operating the same under the control of the local key of substation 61. Contacts 222 make to prepare a pulsing circuit to the register relays of Fig. 4. Contacts 223 make to prepare a locking circuit for the register relays of Fig. 4. Contacts 224 break to release relay 110 of the call allotter over a path heretofore described for operating the same. Relay 110 releases to enable the call allotter to select other available local links.

Relay 210 follows the first series of impulses from the dial of substation 61 to cause the control relays to advance on each pulse. The first digit of the number dialed in this instance is "0," and on the first restoration of relay 210, slow-to-release relay 230 operates over the following path: battery, relay 230, contacts 354, conductor 215, contacts 222, contacts 212 and ground. Relay 230 will remain operated until the first series of impulses are completed. Contact 231 breaks thus preventing the digit locking relay 334 from operating until the completion of the first series of impulses.

Counting relay 300 operates on the first impulse at the same time that relay 230 operates. The path for operating counting relay 300 is as follows: battery, relay 300, contacts 325, contacts 316, contacts 306, contacts 354, conductor 215, contacts 222, contacts 212 and ground. Relay 300 operates and contacts 301 make to short circuit switching relay 324 thus preventing its operation at this moment over the following path: ground, contacts 223, conductor 204, contacts 318, relay 324, contacts 301, contacts 325, contacts 316, contacts 306, contacts 354, conductor 215, contacts 222, contacts 212 and ground. Contacts 302 make to prepare a circuit to a cut-off relay of the cross-bar switch associated with the unit digit 1. Contacts 303 prepare a pulsing circuit to counting relay 310.

After the first pulse interruption from the calling substation 61, relay 210 reoperates to remove ground at the pulsing contact 212 thereby removing the shunt from relay 324 to now permit relay 324 to operate in series with relay 300 over the following path: battery, relay 300, contacts 301, relay 324, contacts 318, conductor 204, contacts 223 and ground.

Switching relay 324 operates and contacts 327 make to prepare a circuit to counting relay 310. Contacts 325 open the original energizing circuit of relay 300 now locked in series with relay 324, contact 326 prepares the circuit to relay 334, contacts 328 break to open an operating circuit to relay 304. The second pulse again interrupts relay 210 which restores to complete a circuit to counting relay 310 over the following path: battery, relay 310, contacts 303, contacts 327, contacts 316, contacts 306, contacts 354, conductor 215, contacts 222, contacts 212 and ground. Contacts 311 make to short circuit switching relay 314 thus preventing its operation at this moment over the following path: ground, contacts 223, conductor 204, contacts 308, relay 314, contacts 311, contacts 303, contacts 327, contacts 316, contacts 306, contacts 354, conductor 215, contacts 222, contacts 212 and ground. Contacts 312 make to prepare a circuit to a cut-off relay of the cross-bar switch associated with the unit digit 2, and contacts 313 make to prepare a circuit to the succeeding counting relay 320 for the next pulse.

After the second pulse interruption transmitted from the calling substation 61, relay 210 reoperates to remove the shunt from switching relay 314 to now permit relay 314 to operate in series with relay 310 over the following path: battery, relay 310, contacts 311, relay 314, contacts 308, conductor 204, contacts 223 and ground. Relay 314 operates and contacts 315 prepare a circuit to operate digit locking relay 334, contacts 317 prepare a circuit to operate the succeeding counting relay 320 for the digit 3, and contacts 318 break to release relays 324 and 310 over a path previously described for operating the same. Contacts 318 breaking removes the ground connection that was had at contacts 223 and also contacts 316 breaking prevents the ground at the pulsing contact 212 from re-operating relay 300. Switching relay 324 releases and contacts 325 make to prepare an operating circuit for the counting relay 300. Contacts 326 break to open a circuit previously prepared to operate the locking relay 334, and contact 328 makes to prepare a circuit to operate switching relay 304. Relay 300 releases and contacts 301 break to open a circuit for operating relay 324. Contacts 302 break to open a circuit prepared to operate a cut-off relay of the cross-bar switch, and contacts 303 open the original energizing circuit of relay 310.

The third pulse interruption of relay 210 places ground on contacts 212 to operate relay 320 over the following path: battery, relay 320, contacts 313, contacts 317, contacts 306, contacts 354, conductor 215, contacts 222, contacts 212 and ground. Relay 320, the counting relay for digit 3, operates and contacts 321 make to short circuit relay 304 thus preventing its operation at this moment over the following path: ground, contacts 223, conductor 204, contacts 328, relay 304, contacts 321, contacts 313, contacts 317, contacts 306, contacts 354, conductor 215, contacts 222, contacts 212 and ground. Contacts 322 make to prepare a circuit to operate a cut-off relay of the cross-bar switch, and contacts 323 make to prepare a circuit to the succeeding counting relay 330 for the digit 4.

After the third pulse interruption transmitted from the substation 61, relay 210 reoperates to remove the shunt from switching relay 304 to now permit relay 304 to operate over the following path in series with counting relay 320: battery, relay 320, contacts 321, relay 304, contacts 328, conductor 204, contacts 223 and ground. Relay 304 operates and contacts 305 prepare a circuit to operate the digit locking relay 334. Contacts 307 make to prepare a circuit to operate counting relay 330. Contacts 308 break to release relays 314 and 310 over a path previously described for operating the same. Contacts 306 breaking prevents relay 310 from operating over the pulsing circuit.

Relay 314 releases to prepare a pulsing circuit for relays 300 and 310 at contacts 316. Contacts 318 make to prepare a circuit to operate switching relay 324 and contacts 315 break to open a circuit prepared to operate relay 334. Relay 310 releases and contacts 311 break to open the operating circuit to relay 314; contacts 312 break to open a circuit prepared to operate a cut-off relay of the cross-bar switch and contacts 313 break to open the pulsing circuit of relay 320.

The fourth pulse interruption of relay 210 operates the register relay 330 for the digit 4 over the following path: ground, contacts 212, contacts 222, conductor 215, contacts 354, contacts 307, contacts 323, relay 330 and battery.

Relay 330 operates and contacts 331 short circuit switching relay 324 to prevent its operation over the following path: ground, contacts 223, conductor 204, contacts 318, relay 324, contacts 331, contacts 323, contacts 307, contacts 354, conductor 215, contacts 222, contacts 212 and ground.

After the fourth pulse interruption transmitted from the substation 61, relay 210 reoperates to remove the shunt from switching relay 324 to now permit relay 324 to operate in series with relay 330 over the following path: battery, relay 330, contacts 331, relay 324, contacts 318, conductor 204, contacts 223 and ground. Relay 324 operates and contacts 327 prepare a pulsing circuit to relays 340 and 310. Contacts 326 make to prepare an operating circuit for digit locking relay 334. Contacts 328 break to release relays 304 and 320 over a path previously described for operating the same.

Relay 304 releases and contacts 308 prepare an operating circuit for switching relay 314. Contacts 306 make to prepare a pulsing circuit to counting relay 340. Contacts 305 break to open a circuit prepared to operate relay 334. Relay 320 releases and contacts 321 open the operating circuit to relay 304. Contacts 322 open a circuit prepared to operate a cut-off relay of the cross-bar switch. Contacts 323 open the pulsing circuit to relay 330.

The fifth dialed pulse interruption releases relay 210 to operate the counting relay 340 over the following path: battery, relay 340, contacts 333, contacts 327, contacts 316, contacts 306, contacts 354, conductor 215, contacts 222, contacts 212 and ground. Register relay 340 operates and contacts 341 make to shunt relay 314 thus preventing its operation at this moment over the following path: ground, contacts 223, conductor 204, contacts 308, relay 314, contacts 341, contacts 333, contacts 327, contacts 316, contacts 306, contacts 354, conductor 215, contacts 222, contacts 212 and ground.

After the fifth interruption, relay 210 reoperates to remove the ground on contacts 212 and switching relay 314 operates in series with relay 340 over the following path: battery, relay 340, contacts 341, relay 314, contacts 308, conductor 304, contacts 223 and ground.

Relay 314 operates and contacts 315 prepare a circuit to operate the digit locking relay 334. Contacts 317 prepare a pulsing circuit to relay 350. Contacts 318 break to release relays 324 and 330 over a path previously described for operating the same.

Relay 324 releases and contacts 325 prepare a pulsing circuit for relay 300. Contacts 328 prepare a circuit to operate relay 304 and contacts 326 open a circuit prepared to operate the digit locking relay 334. Relay 330 releases and contacts 331 open the operating circuit to relay 324, contacts 332 open a circuit prepared to operate a cut-off relay of the cross-bar switch and contacts 333 open the pulsing circuit to relay 340.

The sixth dialed pulse interruption of the first digit operates the tens counting relay 350 for the digit 6 over the following path: battery, relay 350, contact 342, contact 337, contact 317, contact 306, contact 354, conductor 215, contacts 222, contacts 212 and ground.

Relay 350 operates and contacts 351 make to shunt relay 304 thus preventing its operation over the following path: ground, contacts 223, conductor 204, contacts 328, relay 304, contacts 344, contacts 351, contacts 342, contacts 337, contacts 317, contacts 306, contacts 354, conductor 215, contacts 222, contacts 212 and ground. Contacts 352 prepare a pulsing circuit to tens register relay 360. It is to be noted that the contacts 354′—357′, inclusive, are connected in a similar manner as contacts 353′ to operate an associated cut-off relay, such as relay 40, in the cross-bar switch. Specifically, the cut-off relays to be operated are those associated with stations 61–65, inclusive.

After the sixth dial interruption of the first digit, relay 210 reoperates to remove the ground at contacts 212 to thereby operate relay 304 over the following bath: ground, contacts 223, conductors 204, contacts 328, relay 304, contacts 344, contacts 351, relay 350 and battery.

Relay 304 operates and contacts 308 break to release relays 314 and 340 over a path previously described for operating the same. Relay 314 releases and contacts 318 prepare an operating circuit for relay 324. Contacts 315 break to open a circuit prepared to operate the digit locking relay 334. Contacts 316 prepare a pulsing circuit to counting relay 300. Relay 340 releases and contacts 341 open an operating circuit to relay 314; contacts 342 open a pulsing circuit to counting relay 350.

The seventh pulse interruption releases relay 210 to operate the tens counting relay 360 for the digit 7 over the following path: battery, relay 360, contacts 352, contacts 338, contacts 307, contacts 354, conductor 215, contacts 222, contacts 212 and ground. Relay 360 operates and contacts 361 make to short circuit relay 324 to prevent its operation over the following path: ground, contacts 223, conductor 204, contacts 318, relay 324, contacts 348, contacts 361, contacts 352, contacts 338, contacts 307, contacts 354, conductor 215, contacts 222, contacts 212 and ground. Contacts 362 prepare a pulsing circuit to tens counting relay 370. Contacts 363–367, inclusive, are similar to contacts 353′ for completing a circuit to operate an associated cut-off relay.

After the seventh pulse interruption, relay 210 is reoperated over a path heretofore described and relay 324 operates in series with relay 360 over the following path: ground, contacts 223, conductor 204, contacts 318, relay 324, contacts 348, contacts 361, relay 360 and battery.

Relay 324 operates and contacts 326 prepare a circuit to operate the digit locking relay 334. Contacts 327 make to prepare a pulsing circuit to counting relay 370 and contacts 328 break to release switching relay 304 and counting relay 350 over a path previously described for operating the same.

Relay 304 releases and contacts 305 open a circuit prepared to operate the locking relay 334. Contacts 306 make to prepare a pulsing circuit to relay 370. Contacts 308 make to prepare an operating circuit for switching relay 314. Relay 350 releases and contacts 351 open an operating circuit to relay 304. Contacts 353'–357', inclusive, break to insure no connection to the cut-off relays corresponding to tens digit 6. Contacts 352 break to open a pulsing circuit to counting relay 360.

The eighth digital impulse again releases relay 210 over a path heretofore described for operating the same and ground on contacts 212 operates the counting relay 370 over the following path: ground, contacts 212, contacts 222, conductor 215, contacts 354, contacts 306, contacts 316, contacts 327, contacts 336, contacts 362, relay 370 and battery.

Relay 370 operates and contacts 371 complete a short circuit to the switching relay 314 to prevent the operation of the same at this moment. Contacts 372 prepare a pulsing circuit to the counting relay 380. Contacts 373–377, inclusive, prepare a circuit to the cut-off relays at the cross-bar switch associated with the tens digit 8.

After the eighth digital interruption, relay 210 reoperates over a path heretofore described. Ground is removed at contacts 212 to open the shunt circuit to operate switching relay 314 in series with relay 370 over the following path: ground, contacts 223, conductor 204, contacts 308, relay 314, contacts 346, contacts 371, relay 370 and battery.

Switching relay 314 operates and contacts 318 break to release relays 324 and 360. Contacts 315 make to prepare a circuit to operate the locking relay 334. Contacts 317 make to prepare a pulsing circuit to counting relay 380.

Relay 324 releases and contacts 326 break to open a circuit prepared to operate the locking relay 334. Contacts 325 make to prepare a pulsing circuit to relay 300. Contacts 328 make to prepare an operating circuit for the switching relay 304. Relay 360 releases and contacts 361 open an operating circuit to relay 324. Contacts 362 open the pulsing circuit to relay 370. Contacts 363–367, inclusive, open the circuits prepared to operate the cut-off relays associated with the tens digit 7.

The ninth digital interruption from the substation 61 again releases the line relay 210 to operate the counting relay 380 over the following path: ground, contacts 212, contacts 222, conductor 215, contacts 354, contacts 306, contacts 317, contacts 337, contacts 372, relay 380 and battery.

Relay 380 operates and contacts 381 make to complete a short circuit to prevent the switching relay 304 from operating over the following path: ground, contacts 223, conductor 204, contacts 328, relay 304, contacts 344, contacts 381, contacts 372, contacts 337, contacts 317, contacts 306, contacts 354, conductor 215, contacts 222, contacts 212, and ground. Contacts 387 make to prepare a pulsing circuit to the counting relay 390. Contacts 382–386, inclusive, prepare operating circuits to the cut-off relays of the cross-bar switch, not shown, associated with the tens digit 9.

After the ninth pulse interruption, line relay 210 reoperates over a path heretofore described. Contacts 212 remove the shunting ground to switching relay 304. Switching relay 304 operates in series with relay 380 over the following path: ground, contacts 223, conductor 204, contacts 328, relay 304, contacts 344, contacts 381, relay 380 and battery.

Relay 304 operates and contacts 308 break to release relays 314 and 370 over a path previously described for operating the same. Relay 314 releases and contacts 315 open a path prepared to operate the locking relay 334. Contacts 316 prepare a pulsing circuit. Contacts 318 prepare an operating circuit to the switching relay 324. Relay 370 releases and contacts 371 open an operating circuit to the relay 314. Contacts 372 open the pulsing circuit to relay 380. Contacts 373–377, inclusive, break to open a circuit prepared to the cut-off relays of the cross-bar switch.

The tenth digital impulse dialed from the substation "61" representing the tens digit "0" again releases the line relay 210 to operate the counting relay 390 over the following path: ground, contacts 212, contacts 222, conductor 215, contacts 354, contacts 307, contacts 338, contacts 387, relay 390 and battery. Relay 390 operates and contacts 391 complete a circuit to short circuit the switching relay 324 over the following path: ground, contacts 223, conductor 204, contacts 318, relay 324, contacts 348, contacts 391, contacts 387, contacts 338, contacts 307, contacts 354, conductor 215, contacts 222, contacts 212 and ground. Contacts 392–396, inclusive, prepare operating circuits to the cut-off relays of the cross-bar switch associated with the tens digit "0" of which "05" is the only one shown. The other circuits are similar to that shown for cut-off relay 50 of Fig. 1.

After the tenth digital interruption, line relay 210 reoperates over a path heretofore described. Contacts 212 break to remove a shunting ground to the relay 324 and relay 324 operates in series with relay 390 over the following path: ground, contacts 223, conductor 204, contacts 318, relay 324, contacts 348, contacts 391, relay 390 and battery.

Relay 324 operates and contacts 326 prepare a circuit to operate the locking relay 334. Contacts 327 prepare a pulsing circuit. Contacts 328 break to release relays 304 and 380. Relay 304 releases and contacts 305 break to open a circuit prepared to operate the locking relay 334. Contacts 306 make to prepare a pulsing circuit to counting relay 300. Contacts 308 make to prepare an operating circuit to the switching relay 314. Relay 380 releases and contacts 387 open the pulsing circuit to relay 390. Contacts 381 break to open an operating circuit to relay 304. Contacts 382-386, inclusive, break to open circuits prepared to operate the cut-off relays of the cross-bar switch associated with the tens digit "9."

Shortly after the completion of the series of digital impulses for the tens digit "0," slow-to-release relay 230 releases. Contacts 231 close to operate the digit locking relay 334 over the following path: ground, contacts 223, contacts 231, contacts 326, contacts 262, relay 334 and battery.

Relay 334 operates and contacts 335 make to lock relay 334 over the following path: battery, relay 334, contacts 335, relay 260 contacts 223 and ground. The relay 260 is now shorted out to prevent its operation over the following path: ground, contacts 223, contacts 231, contacts 326, conductor 203, contacts 262, conductor 205, contacts 335, conductor 207, relay 260, contacts 223 and ground.

Contacts 336, 337, and 338 break to open the pulsing circuits to the tens counting relays 350–390, inclusive. Contacts 339, 345, 347, make before contacts 344, 346 and 348 break. Contacts 348 open to release the only operated switching relay 324. Contacts 347 further lock the operated tens counting relay 390 over the following path: battery, relay 390, contacts 391, contacts 347, conductor 204, contacts 223 and ground. Relay 390 therefore remains operated.

Relay 324 releases and contacts 326 break to remove the shunting circuit to relay 260 thereby permitting relay 260 to operate in series with relay 334 over the following path: ground, contacts 223, relay 260, conductor 207, contacts 335, relay 334 and battery. Relay 260 operates and contacts 261 prepare a circuit to operate relay 353.

It should be noted at this time that by the operation of relay 334 the operated tens relay, such as relay 390, is locked in operated position and that the operated switching relay, such as relay 324, is released so that the first five counting relays can be reused for counting the second, or units, digit.

The circuit is now prepared for the dialing of the second digit, or units digit, which in this instance is "5." The first impulse of this series of digital impulses interrupts the operation of line relay 210 over a path heretofore described for operating the same. Ground on contact 212 operates the unit counting relay 300 representing the digit 1 over the following path: ground, contacts 212, contacts 222, conductor 215, contacts 354, contacts 306, contacts 316, contacts 325, relay 300 and battery. The first impulse also operates slow-to-release relay 230 over the following path: ground, contacts 212, contacts 222, conductor 215, contacts 354, conductor 202, relay 230 and battery.

Slow-to-release relay 230 operates and remains operated until the completion of the digital impulses. Contacts 231 break to open the operating circuit of relay 353. Counting relay 300 operates and contacts 301 make to shunt the switching relay 324 to prevent its operation at this moment over the following path: ground, contacts 223, conductor 204, contacts 318, relay 324, contacts 301, contacts 325, contacts 316, contacts 306, contacts 354, conductor 215, contacts 222, contacts 212 and ground. Contacts 302 prepare a circuit to the cut-off relay of the cross-bar switch associated with the unit digit 1. Contacts 303 prepare a pulsing circuit to counting relay 310.

After the completion of the first impulse interruption, line relay 210 reoperates over a path heretofore described. Contact 212 breaks to remove the shunting circuit to switching relay 324. Switching relay 324 operates in series with relay 300 over the following path: ground, contacts 223, conductor 204, contacts 318, relay 324, contacts 301, relay 300 and battery.

Switching relay 324 operates and contacts 326 prepare an operating circuit to the relay 353. Contacts 327 prepare a pulsing circuit to the counting relay 310. Contacts 328 open an operating circuit to the switching relay 304.

The second digital impulse for the second digit transmitted from the substation 61 again interrupts the operation of the line relay 210. Ground on contacts 212 operates the counting relay 310 for the unit digit 2 over the following path: ground, contacts 212, contacts 222, conductor 215, contacts 354, contacts 306, contacts 316, contacts 327, contacts 303, relay 310 and battery.

Relay 310 operates and contacts 311 make to complete a circuit to short circuit the switching relay 314 over the following path: ground, contacts 223, conductor 204, contacts 308, relay 314, contacts 311, contacts 303, contacts 327, contacts 316, contacts 306, contacts 354, conductor 215, contacts 222, contacts 212 and ground. Contacts 312 prepare a circuit to operate a cut-off relay of the cross-bar switch associated with the units digit 2. Contacts 313 prepare the pulsing circuit for counting relay 320.

After the completion of the second digital impulse, line relay 210 reoperates and removes ground from contacts 212 to operate the switching relay 314 in series with relay 310 over the following path: ground, contacts 223, conductor 204, contacts 308, relay 314, contacts 311, relay 310 and battery.

Relay 314 operates and contacts 315 prepare a circuit to operate the relay 353. Contacts 317 prepare a pulsing circuit to relay 320. Contacts 318 break to release relays 324 and 300.

Switching relay 324 releases and contacts 326 break to open a circuit prepared to operate the relay 353. Contacts 325 make to prepare a pulsing circuit. Contacts 328 make to prepare a circuit to operate the switching relay 304. Relay 300 releases and contacts 301 open the operating circuit to relay 324. Contacts 302 open the circuit prepared to operate a cut-off relay of the cross-bar switch and contacts 303 open the pulsing circuit to counting relay 310.

The third digital impulse for the second digit transmitted from substation 61 interrupts the operation of line relay 210. Relay 210 releases and ground on contacts 212 operates the counting relay 320 for the unit digit 3 over the following path: ground, contacts 212, contacts 222, conductor 215, contacts 354, contacts 306, contacts 317, contacts 313, relay 320 and battery.

Relay 320 operates and contacts 321 make to complete a short circuit for the switching relay 304 to prevent its operation this moment in the following manner: ground, contacts 223, conductor 204, contacts 328, relay 304, contacts 321, contacts 313, contacts 317, contacts 306, contacts 354, conductor 215, contacts 222, contacts 212, and ground. Contats 322 prepare a circuit to operate a cut-off relay of the cross-bar switch associated with the unit digit 3. Contacts 323 prepare a pulsing circuit for the fourth counting relay 330.

After the completion of the third digital impulse, line relay 210 reoperates to remove ground at contacts 212 thus removing the shunting circuit from switching relay 304. Switching relay 304 operates in series with relay 320 over the following path: ground, contacts 223, conductor 204, contacts 328, relay 304, contacts 321, relay 320 and battery.

Relay 304 operates and contacts 305 prepare a circuit to operate the relay 353; contacts 307 prepare a pulsing circuit to counting relay 330. Contacts 308 break to release switching relay 314 and counting relay 310 over a path previously described for operating the same. Relay 310 releases, and contacts 311 open the operating circuit to relay 314. Contacts 312 open a circuit prepared to operate a cut-off relay associated with the cross-bar switch. Contacts 313 open the pulsing circuit to counting relay 320. Switching relay 314 releases and contacts 315 open a circuit prepared to operate the relay 353. Contacts 316 prepare a pulsing circuit to relay 340. Contacts 318 prepare an operating circuit for the switching relay 324.

The fourth digital impulse of the second digit transmitted from the substation 61 again interrupts the operation of the line relay 210. Ground on contact 212 operates the counting relay 330 over the following path: ground, contacts 212, contacts 222, conductor 215, contacts 354, contacts 307, contacts 323, relay 330 and battery.

Counting relay 330 operates and contacts 331 make to complete a circuit to short circuit switching relay 324 to thereby prevent its operation at this time. Contacts 332 prepare a circuit to operate a cut-off relay of the cross-bar switch associated with the unit digit 4. Contacts 333 prepare a pulsing circuit for the counting relay 340.

After the completion of the fourth digital impulse, line relay 210 reoperates over a path heretofore described. The operation of line relay 210 removes ground from the contacts 212 thereby enabling the switching relay 324 to operate by removing its shunt circuit. Relay 324 operates in series with relay 330 over the following path: ground, contacts 223, conductor 204, contacts 318, relay 324, contacts 331, relay 330 and battery.

Switching relay 324 operates and contacts 326 prepare an operating circuit to the relay 353. Contacts 327 prepare a pulsing circuit to the counting relay 340. Contacts 328 break to release the relays 304 and 320.

Switching relay 304 releases and contacts 305 break to open a circuit previously prepared to operate the relay 353. Contacts 306 prepare a pulsing circuit to the counting relay 340. Contacts 308 prepare an operating circuit for the switching relay 314. Relay 320 releases and contacts 321 break to open the operating circuit of switching relay 304. Contacts 322 open a circuit prepared to operate the cut-off relay of the cross-bar switch associated with the unit digit 3. Contacts 323 break to open the pulsing circuit to counting relay 330.

The fifth digital impulse for the digit "5" is transmitted from the dialing mechanism, not shown, of the substation 61 and again interrupts the operation of the line relay 210. Contacts 212 make to operate the counting relay 340 for the unit digit 5 over the following path: ground, contacts 212, contacts 222, conductor 215, contacts 354, contacts 306, contacts 316, contacts 327, contacts 333, relay 340 and battery.

Relay 340 operates and contacts 341 make to complete a short circuit to prevent switching relay 314 from operating at this moment over the following path: ground, contacts 223, conductor 204, contacts 308, relay 314, contacts 341, contacts 333, contacts 327, contacts 316, contacts 306, contacts 354, conductor 215, contacts 222, contacts 212 and ground.

After the completion of the fifth digital impulse line relay 210 reoperates over a path heretofore described and contacts 212 break to remove ground from the shunting circuit thereby enabling the switching relay 314 to operate in series with relay 340 over the following path: ground, contacts 223, conductor 204, contacts 308, relay 314, contacts 341, relay 340 and battery.

Switching relay 314 operates and contacts 315 prepare a circuit to operate relay 353. Contacts 317 prepare a pulsing circuit. Contacts 318 break to release relays 324 and 330. Switching relay 324 releases and contacts 326 break to open a circuit previously prepared to operate the relay 353. Contacts 325 make to prepare a pulsing circuit to counting relay 300. Contacts 328 make to prepare an operating circuit to switching relay 304. Counting relay 330 releases and contacts 331 open the operating circuit to switching relay 324. Contacts 332 open a circuit prepared to operate a cut-off relay associated with the unit digit 4. Contacts 333 break to open the pulsing circuit to counting relay 340.

Counting relay 340 remains operated since it is locked with switching relay 314 over a path heretofore described. Upon the completion of the transmitting of the digital impulses for the digit "5," slow-to-release relay 230 releases after an interval. Contacts 231 make to complete an operating circuit for relay 353 over the following path: battery, relay 353, conductor 214, contacts 251, conductor 203, contacts 315, conductor 201, contacts 231, contacts 223 and ground.

Recapitulating on the operation of the register relays, it is to be noted that the subscribers' line numbers are 61–65, 71–75, 81–85, 91–95, 01–05. The counting relays 300–340 represent the unit digits 1–5 respectively. The counting relays 350–390 represent the ten digits 6–0, respectively. Since the tens digits of the line numbers are greater than 5, it necessarily follows that the first dialed digit must register in the tens group. The second dialed digit registers in the units group. Therefore, the last five counting relays are used first for the tens digit of the call number. Three switch relays 304, 314, 324 control the pulsing circuits to enable each counting relay to operate in a sequential order. The switching relays also operate in a sequential order and each switching relay is associated with several counting relays. Upon the completion of the first series of digital impulses a locking relay 334 maintains the selected tens relay operated. The sequential activity is then repeated for the unit digit. At the completion of the second series of digital impulses, the selected unit counting relay is locked in series with the associated switching relay to maintain the operation of the unit counting relay. Relay 353 is operated upon the completion of the second series of digital impulses to switch the selected unit digit contact to the selected tens digit contact to register the called line number.

Previously, when relay 220 operated, contacts 223 made to operate slow-to-release relay 270 over the following path: battery, relay 270, conductor 213, contacts 356, conductor 204, contacts 223 and ground. Heretofore relay 270 had no effect on the operation of the system. Contacts 271 are open and have no effect on the circuit. Contacts 272 are closed and prepare a circuit to the busy relay 250.

Relay 353 operates and contacts 354 break to open the pulsing circuit to the counting relays. Contacts 355 and 357 make to complete the busy test circuit. Contacts 356 break to open the operating circuit of slow-to-release relay 270, which does not release for a short interval.

The circuit is now prepared to determine whether the called line is idle or busy. Let us assume at this point that the called line is busy. Therefore, in a local call the local key for substation 05 is operated and the cut-off relay 50 is operated in a manner similar to that described for the operation of cut-off relay 40. In a trunk call the trunk key would be operated and the cut-off relay 50 would be operated. Further, an electrical connection would be established in the cross-bar switch at the terminal strip 18 or 19. Contacts 52 will be operated to put ground on the "C" lead through local key springs 8 and strip 19, or through trunk key springs 15 and strip 18. The operation of substation 05 is similar to that heretofore described for the operation of substation 61.

If the called line is busy, busy relay 250 will operate over the following test circuit: battery, relay 250, contacts 272, conductor 206, contacts 357, contacts 343, contacts 396, conductor 58, either the electrical connection on terminal strip 18 or 19 depending upon which select magnet was operated, contact 8 on a local call or contact 15 on a trunk call, contact 52 and ground.

Busy relay 250 operates and contacts 253 make to lock relay 250 over the following path: battery, contacts 253, contacts 223, and ground. Contacts 252 open the operating circuit to select magnet 10. Contacts 251 make to connect the busy tone to the calling line over the following path: B. T. generator, busy tone condenser, contacts 251, conductor 69, upper contact of terminal strip 23, loop circuit of substation 61, contact of terminal strip 23, conductor 68 and ground.

Let us assume at this point that the called line is idle. There is no ground on the "c" lead of the called line, since the cut-off relay 50 is not operated. The busy relay 250 does not operate over the test circuit heretofore described for the reasons just mentioned. Slow-to-release relay 270 after an interval releases over a path heretofore described for operating the same as a result of contacts 356 breaking. Contacts 271 make to operate the selecting magnet 10 of the cross-bar switch to prepare for the selection of electrical connections for the local incoming trunk line for the local link #1 over the following path: ground, contacts 223, contacts 271, conductor 217, contacts 309, conductor 209, contacts 281, contacts 252, conductor 66, selecting magnet 10, contacts 12, contacts 13, conductor 46, contacts 173, contacts 164, contacts 172, resistance R and battery. Contacts 273 prepare a circuit to operate the cut-off relay 50.

Selecting magnet 10 operates and a vertical bar under the control of the selecting magnet 10 places mechanical obstruction fingers behind the electrical contacts in a manner disclosed in the aforementioned Patent 1,953,503. It is to be noted that no electrical connection is established at terminal strip 21, since the cut-off relay 40 was operated prior to the operation of the selecting magnet 10. The selecting magnet is interlocked with the call allotter, shown in Fig. 2, so that it will not be possible to direct calls to and from links simultaneously. The selecting magnet 10 upon operating closes contact 14 to operate the cut-off relay 50 over the following path: battery, cut-off relay 50, "C" conductor 58, contacts 396, contacts 343, contacts 357, contacts 273, conductor 59, contacts 14 and ground. Contacts 11 make first and lock the selecting magnet 10 over an obvious path, and contacts 12 and 13 open the operating circuits for the magnets, similar to magnet 10.

Cut-off relay 50 operates subsequent to the operation of the selecting magnet 10 thereby operating a horizontal bar which engages the mechanical obstruction fingers to cause the electrical contacts at terminal strip 17 to close in a manner disclosed in the aforementioned Reynolds Patent 1,953,503. Electrical connections from the local link #1 are now established to the incoming local trunk channel.

Cut-off relay 50 operates and contacts 52 make to place ground on the "C" lead to busy the substation in case of subsequent incoming calls. Ground is placed on the "C" lead of the incoming channel by the lower electrical contact on terminal strip 17 to operate relay 280 over the following path: battery, relay 280, conductor 76, lower contact of terminal strip 17 and ground. Contact 51 opens the operating circuit of line relay 60.

Relay 280 operates and contacts 282 make to lock the cut-off relay 50 over the following path: ground, contacts 282, contacts 273, conductor 206, contact 357, contacts 343, contacts 396, conductor 58, cut-off relay 50 and battery. Contacts 281 break to release selecting magnet 10 over a path previously described for operating the same. The release of the selecting magnet 10 enables other calls to be completed.

Ringing current is now transmitted over the talking conductors of the called party over a path hereinafter traced for the operation of the ring-cut-off relay 240 to signal the called party. The called party operates his local key and removes his handset and the ring-cut-off relay 240 operates over the following path: int. gen. relay 240, contacts 243, conductor 77, contacts on terminal strip 17, key contacts 9, substation 05, contacts on terminal strip 17, conductor 78, contacts 241 and ground.

Relay 240 operates and contacts 245 lock the relay 240 over the following path: battery, relay 240, contacts 245, contacts 223 and ground. Contacts 241 and 243 break to disconnect the ringing circuit. Contacts 242 and 244 make to complete the talking circuit from substation 61 to substation 05, over the following path: substation 61, key contacts 97, contacts of terminal strip 23, local outgoing trunk #1, conductor 68, contacts 244, conductor 77, local incoming trunk channel #1, contacts on terminal strip 17, key contacts 9, substation 05, contacts on terminal strip 17, conductor 78, contacts 242, conductor 69, local outgoing trunk channel #1, contacts on terminal strip 23, and substation 61. Combined battery feed and back bridge relay 200 maintains the called line connection in a manner well-known in the art. The release of the connection is under control of the calling party.

Upon termination of the call, the calling party replaces his handset and line relay 210 restores over a path previously described for operating the same. Further, the calling party replacing his handset restores the local key to its normal position and thereby restoring the cut-off relay 40 over a path previously described for operating the same.

The releasing of cut-off relay 40 and restoring the local key releases relay 220 over its locking circuit in a manner described for operating the same. The releasing of relay 220 removes ground from contacts 223 thereby releasing the following relays: 334, 260, 390, 340, 314, 353 and 240.

Cut-off relay 50 restores in response to the release of relay 353 over a path previously described for locking the same. Relay 280 restores in response to the release of cut-off relay 50, which removes ground from the "C" lead of the incoming trunk channel. Relay 200 restores in response to the releasing of relay 240 over a path previously described for operating the same. The system is now prepared for further operation

*Two-way trunk calls*

When a party initiates an outgoing trunk call, he removes his handset and depresses the trunk key associated with the trunk he wishes to use. The key locks in position in a well-known manner. The calling party in this instance is substation 61 and two-way trunk channel #1 is used. For other two-way trunk lines, connections similar to trunk 1 may be used. It is further assumed that the call is a non-restricted call.

Responsive to the lifting of the handset, not shown, and the subsequent depressing of the trunk #1 connecting key, line relay 70 operates over the following path: battery, relay 70, contacts 41, over the line loop through the substation instrument 2, contacts 99, contacts 43 and ground.

Line relay 70 operates and contacts 71 prepare a circuit from the local start conductor 33. Contacts 72 prepare a circuit to the trunk start lead 24. Contacts 73 prepare a locking circuit to the busy relay 90. Contacts 74 complete a circuit to operate relay 160 representing the tens digit 6. Contacts 75 prepare a circuit to operate relay 180 representing the units digit 1.

Relay 160 of the call allotter operates over the following path: ground, contacts 92, contacts 74, conductor 44, relay 160, contacts 167, conductor 47, contact 13, conductor 46, and over the chain circuit through other contacts of trunk selecting magnets, such as magnet 10, contacts 173, and over the chain circuit of contacts on relays similar to relays 160 and 170, contacts 164, contacts 172, resistance R and battery. Relay 160 is associated with all the substations in the "60" group and represents the tens digit 6.

Relay 160 operates and contacts 164 open the circuit to selecting magnet 10 and also open the series through connection to all tens relays after contacts 162 close. Contacts 162 first complete a locking circuit for relay 160 over the following path: ground, contacts 92, contacts 74, conductor 44, relay 160, contacts 162, resistance R and battery. Contacts 167 open the original operating circuit to relay 160. Contacts 161 prepare an operating circuit to cut-off relay 40. Contacts 163 close to prepare a circuit to the trunk busy lead. Contacts 165 close to prepare a ground connection to the M. G. lead of the calling line, shown as conductor 34. Contacts 166 close to operate the relay 180 of the call allotter, representing the unit digit 1. Relay 180 representing unit digit 1 of the call allotter is associated with all the stations having the same unit digit 1.

Relay 180 operates over the following path: ground, contacts 93, contacts 75, conductor 45, contacts 166, relay 180, contacts 184, contacts 196, series connection through all units relays, contacts 186, resistance R1, and battery. Contacts 181 make to further prepare an operating circuit to the cut-off relay 40 of the calling line. Contacts 182 further prepare the busy connection to the two-way trunk circuit. Contacts 183 make to ground the M. G. lead 34 of the calling party over the following path: ground, contacts 183, contacts 165 and conductor 34.

"X" contacts 185 make before the other contacts break to lock relay 180 over a path heretofore described. Contacts 184 break to open a path multiple to the unit relays and contacts 186 break to open the series through path to the unit relays.

Ground on the M. G. lead grounds the trunk start lead 24 to operate the selecting magnet 20 of the cross bar switch associated with two-way trunk channel #1, if idle, over the following path: battery, selecting magnet 20, conductor 29, contacts 495, connection 401, conductor 24, contacts 72, contacts 98, contacts 165 contacts 183 and ground.

Let us assume that the trunk channel is idle and the selecting magnet 20 operates. With the selecting magnet 20 operated, a vertical bar places mechanical obstruction fingers behind the electrical contacts in a manner disclosed in the aforementioned Patent #1,953,503. Contacts 78 make to complete a circuit for operating the cut-off relay 40 of the substation 61.

Relay 40 operates over the following path: ground, contacts 78, conductor 48, contacts 181, contacts 161, conductor 56, relay 40 and battery. Cut-off relay 40 operates a horizontal bar which engages the mechanical obstruction fingers to cause the electrical contacts at terminal strip 22 to close in a manner disclosed in the aforementioned Reynolds Patent 1,953,503. The electrical connections established at terminal strip 22 complete the circuits from the substation 61 to the selected two-way trunk channel #1.

In response to cut-off relay 40 operating, contacts 42 make to lock relay 40 through the key of trunk #1 of substation 61 over the following path: battery, relay 40, lower contacts of terminal strip 22, contacts 98, contacts 42, and ground. Contacts 41 and 43 break to release the line relay 70 over a path previously described for operating the same.

Relay 70 releases thereby releasing relay 160 at contacts 74 over a path previously described for operating the same, and further releasing relay 180 at contacts 75 over a path previously described for operating the same. Contacts 72 break to release selecting magnet 20 over a path previously described for operating the same. The releasing of relays 160 and 180 and the selecting magnet 20 enable a call from another line to be initiated.

After the cut-off relay 40 operated and electrical connections were established from the substation 61 through the cross-bar switch at the terminal strip 22, relay 460 of the two way trunk circuit, shown in Fig. 5, operates in the following manner: battery, relay 460, conductor 26, third and first sets of contacts (counting from the bottom) on terminal strip 22, contacts 98, contacts 42 and ground. Contacts 42 ground the "C" lead of the two-way trunk channel in the manner just described. It is to be noted that each two-way trunk channel has an individual two-way trunk circuit associated therewith as shown in Fig. 5.

Relay 460 operates and contacts 461 open a locking circuit to relay 430. Contacts 467 open the operating circuit to relay 420 and contacts 463 open the locking circuit to relay 410. Contacts 464 make to transfer the trunk start lead 24 from the conductor 29 to the busy lead 57 so as to make the trunk #1 busy. The loop circuit from substation 61 to the distant exchange is completed in the following manner: distant exchange, contacts 432, conductor 28, upper contacts on terminal strip 22, loop circuit of substation 61, contacts 99, second upper contacts on terminal strip 22, conductor 27, contacts 436, and distant exchange. The desired connection from this point on may be made in any well-known manner.

Considering now the operation when the two-way trunk channel is busy and an outgoing call is in progress for this trunk channel. Let us assume that station 05 seized the trunk channel to busy the same in a manner similar to that described for the operation of station 61. Substation 61 now initiates a call and operates the system in a manner similar to that just described. Line relay 70 operates in a manner heretofore described. Subsequently, relays 160 and 180 operate in a manner heretofore described. When the two-way trunk channel is busy, the circuit associated therewith has the relay 460 operated in a manner similar to that heretofore described. At this point the busy relay 90 of the calling line operates over the following path: battery, relay 90, conductor 39, contacts 163, contacts 182, conductor 57, contacts 464, terminal 401, conductor 24, contacts 72, contacts 98, conductor 34, contacts 165, contacts 183 and ground.

Busy relay 90 operates and contacts 91 lock the relay 90 over the following path: battery, relay 90, contacts 91, contacts 73 and ground. Contacts 92 break to release relay 160 over a path heretofore described for operating the same. Contacts 93 break to release relay 180 over a path heretofore described for operating the same. Contacts 94 make to send a busy tone over the loop circuit to the calling line. The call allotter is now free to be used for other calls. The calling party upon receiving the busy tone, replaces his handset to release line relay 70 and trunk key 1. The calling party can initiate a call to another two-way trunk channel by merely depressing the trunk connecting key corresponding to the desired trunk.

Considering further the operation when an outgoing trunk call is initiated and the two-way trunk channel is idle. The parties finish conversing and the calling party restores his handset. Trunk #1 is restored to normal to release cut-off relay 40 over a path previously described for operating the same. Restoring of cut-off relay 40 takes ground off the "C" lead at contacts 42 to release relay 460 of the two-way trunk circuit to remove the busy guard circuit. The opening of the loop circuit at the calling line causes release of the distant connection in a well-known manner.

Considering now a call initiated from a distant exchange over the two-way trunk channel. When an incoming call seizes the two-trunk circuit, shown in Fig. 5, relay 420 operates from the ringing current over the following path: distant exchange, negative talking conductor, condenser C1, relay 420, contacts 462, positive talking conductor and distant exchange.

Relay 420 operates and contacts 421 make to operate slow-to-operate relay 410 over the following path: battery, relay 410, contacts 421, and ground. Contacts 412 make to lock relay 420 over the following path: battery, relay 410, contacts 412, contacts 463 and ground. Contacts 413 make to connect the out restricted lead through to conductor 29 so that any party denied outgoing service may answer an incoming call. Contacts 411 make to operate the incoming trunk signal to indicate the receipt of a trunk call over the two-way trunk channel #1. Each incoming trunk signal is individual to a particular trunk.

Any substation subscriber upon observing the incoming trunk signal may answer the incoming trunk call by raising his handset and depressing the trunk key associated with the particular trunk channel. The operation for extending the connection through the cross-bar switch is the same as was described heretofore in reference to an outgoing trunk call. Relay 460 operates in a manner heretofore disclosed and contacts 463 break to release relay 410 over a path heretofore described for operating the same.

Contacts 462 break to open the circuit to relay 420. Contacts 464 make to put ground on the "C" lead to busy the trunk channel.

Relay 410 releases and contacts 411 break to discontinue the incoming trunk call signal.

Considering now the operation of holding a trunk call on the two-way trunk channel, the hold key at substation 61 is depressed to enable the subscriber to converse with another local party and maintain the connection with the original caller. Contacts 95 close to operate relay 450 over the following path: battery, relay 450, conductor 25, second lower contacts of terminal strip 22, contacts 95, contacts 42 and ground.

Simultaneously with the depressing of the hold key, the trunk connecting key #1 restores because of the mechanical interlocking action. In response to the restoration of the trunk connecting key #1, contacts 98 open to release both cut-off relay 40 and relay 460 over a path previously described for operating the same. As a result thereof, the cross-bar switch releases.

Relay 450 operates and contacts 453 complete a locking circuit over the following path: battery, relay 450, contacts 453, contacts 442 and ground. Contacts 452 make to operate relay 430 over the following path: battery, relay 430, contacts 452 and ground.

Relay 430 operates and contacts 433 make before contacts 432 break; contacts 435 make before contacts 436 break thereby providing a holding circuit for the distant exchange through relay 440. Contacts 431 make to operate the call held signal to indicate to all subscribers that the trunk connected to the two-way trunk channel #1 is being held.

Relay 440 operates over the trunk loop through the contacts 433 and 435. Contacts 441 make to provide a locking circuit for relay 430 over the following path: battery, relay 430, contacts 434, contacts 461, contacts 441 and ground. Contacts 442 break to release relay 450.

When the subscriber at substation 61 depresses the hold key, he simultaneously restores the connecting key to trunk #1 thereby releasing the cut-off relay 40 and the relay 460. This enables the subscriber to use the substation for another call while the original party is held in a manner just described.

When a subscriber at substation 61 desires to converse again with the held party, he again depresses his trunk connecting key #1 and a connection is again established to the two-way trunk channel in a manner heretofore described. As a result thereof, cut-off relay 40 and relay 460 re-operate in a manner heretofore described.

Relay 460 operates and contacts 461 break to open the locking circuit for relay 430 to release relay 430. Contacts 433 and 435 break to release relay 440 over a path previously described for operating the same. Contacts 431 break to discontinue the call held signal. Contacts 432 and 433 make to reconnect substation 61 to the distant exchange. Relay 440 releases and contacts 442 close to prepare a locking circuit for relay 450.

While there has been described what is at present considered to be the preferred embodiment of the invention, it is to be understood that various modifications may be made thereof, and it is contemplated within the appended claims to cover all such modifications within the true spirit and scope of the invention.

What is claimed is:

1. A register relay circuit wherein a series of counting relays are arranged to be sequentially operated by successive impulses of a single series of impulses transmitted over an impulsing circuit connected thereto and wherein said counting relays are successively restored as the succeeding counting relay is operated, in combination with a first relay, a first and a second group for said counting relays, a circuit for operating said first relay, means for sequentially operating said first and second groups of counting relays, means whereby said last-mentioned means is operated responsive to the transmission of said series of impulses, relay means for completing said first relay circuit, means whereby said relay means is operated by said first means only in response to the completion of said series of impulses circuits controlled by the operation of said first relay for dividing said series of counting relays into said first and second group and for disconnecting the counting relays included in said second group from said impulsing circuit to prevent reoperation of said second group counting relays, and locking circuits completed by the operation of said first relay for locking the last operated one of said counting relays in said second group.

2. A register relay circuit wherein a series of counting relays are arranged to be sequentially operated by successive impulses of a first series of impulses transmitted over an impulsing circuit connected thereto and wherein said counting relays are successively restored as the succeeding counting relay is operated, in combination with a first relay, contacts on said relay for dividing said counting relays into a first and second group, means whereby said first group and at least part of said second group are operated in response to said first series of impulses, a circuit for operating said first relay, other relay means for completing said circuit, means whereby said other relay means is operated responsive only to termination of said first series of impulses, a locking circuit completed by the operation of said first relay for locking the last operated one of said counting relays to maintain said one counting relay operated during receipt of a subsequent series of impulses, said first group of counting relays being sequentially reoperated over said same impulsing circuit in response to the receipt of a second series of impulses transmitted thereto, a selecting circuit including contacts on said one locked counting relay and the last counting relay operated by said second series of impulses, a second relay for completing said selecting circuit and means whereby said second relay is operated responsive to termination of said second series of impulses.

3. A register relay circuit wherein a series of counting relays are arranged to be sequentially operated by successive impulses of a first series of impulses transmitted over an impulsing circuit connected thereto and wherein said counting relays are successively restored as the succeeding counting relay is operated, in combination with a first relay, contacts on said relay for dividing said counting relays into a first and a second group, a circuit for operating said first relay, circuits for operating the counting relays of both said groups over said impulsing circuit, means whereby said last-mentioned circuits are completed in response to said first series of impulses, means for completing said first relay circuit, means whereby said last-mentioned means is operated in response to the termination of said first series of impulses for thereby operating said relay, circuits controlled by said first relay contacts for dividing said series of counting relays into said first and second group and for disconnecting the counting relays included in said second group from said impulsing circuit to prevent reoperation of said second group counting relays, means whereby said last-mentioned circuits are completed in response to a second series of impulses, a locking circuit completed by the operation of said first relay for locking the last operated one of said counting relays in said second group, said first group counting relays being sequentially reoperated over said impulsing circuit in response to a second series of impulses transmitted thereto, a selecting circuit including series contacts on said one locked counting relay in said second group and the last operated one of said counting relays in said first group, a second relay for completing said selecting circuit, and means whereby said second relay is operated responsive to the termination of said second series of impulses.

4. In a register relay circuit, a group of counting relays arranged for division into two groups for registering a first and a second series of received digital impulses, a group of switching relays, a first means for transmitting two series of digital impulses, a pulsing circuit operated by said first means and controlled by said switching relays for operating both groups of said counting relays sequentially, means whereby said first means is operated in response to the receipt of the first series of received digital impulses and controlled by said switching relays for operating both groups of said counting relays sequentially, circuits controlled by said counting relay for operating said switching relays seriatim, a circuit controlled by the last operated switching relay to release the prior operated switching relay and the next to the last operated counting relay, a first relay, means for operating said first relay, means whereby said last means is operated at the completion of the first series of digital impulses, circuits controlled by the operation of said first relay for dividing said counting relays into said groups and for locking the last operated counting relay, means whereby said pulsing circuit is again controlled by said first means in response to the receipt of the second series of digital impulses to thereby reoperate certain counting relays of the group not including said last operated counting relay, and a circuit for locking said last reoperated counting relay.

5. In a register relay circuit, a first and a second group of counting relays for registering a first and second series of received digital impulses, a group of switching relays, a first means for transmitting two series of digital impulses, a pulsing circuit operated by said first means and controlled by said switching relays for operating said counting relays in each said group sequentially, means whereby said first means is operated in response to the first series of digital impulses, circuits controlled by said counting relays for operating said switching relays sequentially, a first relay, means for operating said first relay, means whereby said last means is operated at the completion of the first series of digital impulses, circuits controlled by the operation of said first relay for dividing said counting relays into said groups and opening the pulsing circuit to the last operated couuting relay and for locking said last operated relay, means whereby said pulsing circuit is again completed by said first means in response to the second series of received digital impulses to thereby reoperate certain counting relays in said first group sequentially, and a circuit independent of said first relay for locking the last operated relay in said first group.

6. In a register relay circuit, first and second groups of counting relays for registering a first and second series of received digital impulses, a group of switching relays, a first means for transmitting two series of digital impulses, a second means controlled by said first means for operating said switching relays seriatim, means whereby said second means is operated in response to the receipt of the digital impulses, a pulsing circuit operated by said first means and controlled by said switching relays for operating said counting relays in both groups sequentially, means whereby said first means is operated in response to the first series of received digital impulses, a first relay, means for operating said first relay at the completion of the first series of transmitted digital impulses, a circuit for locking said first relay operated, circuits controlled by the operation of said first relay for locking the last operated counting relay, for releasing any operated switching relay, for opening said pulsing circuit to said second group to enable said pulsing circuit to reoperate only the once operated first group of counting relays, means whereby said pulsing circuit is again completed by said first means in response to the second series of received digital impulses to thereby reoperate certain counting relays in said first group sequentially, and a circuit independent of said first relay for locking said last reoperated counting relay.

7. In a register relay circuit, a first and a second group of counting relays for registering a first and second digit, a first means for transmitting two series of digital impulses, a pulsing circuit for operating the counting relays of both groups sequentially, means whereby said pulsing circuit is controlled by said first means in accordance with the first series of digital impulses transmitted thereby, a first relay, means for operating said first relay, means whereby said last means is operated at the completion of the first series of digital impulses, circuits controlled by the operation of said first relay for locking the last operated counting relay and for opening said pulsing circuit to said second group to enable said pulsing circuit to reoperate only the first group of counting relays, means whereby said pulsing circuit is reoperated by said first means for reoperating said first group of counting relays sequentially, and means whereby said pulsing circuit is reoperated by the second series of digital impulses received from said first means.

8. In a register relay circuit, a first means for transmitting two series of digital impulses, a group of counting relays for registering the first and second digit corresponding to said two series of impulses, a group of switching relays, a second means controlled by said first means for operating said switching relays seriatim, means whereby said second means is operated in response to the receipt of the digital impulses, a pulsing circuit operated by said first means and controlled by said switching relays for operating said counting relays sequentially, a circuit controlled by the last operated switching relay to release the preceding switching relay and the next to the last operated counting relay, a first relay, means for operating said first relay, means whereby said last means is operated at the completion of the first series of digital impulses, circuits completed by the operation of said first relay for locking the last operated counting relay and for opening the pulsing circuit to a predetermined number of counting relays, said pulsing circuit reoperated in accordance with the second series of digital impulses and controlled by said switching relays, means whereby the reoperation of said circuit is caused to reoperate certain counting relays sequentially, a circuit included within said second means for locking said last reoperated counting relay, a series relay, a circuit for operating said series relay in series with said first relay, a second relay, an outgoing trunk circuit, and means for operating said second relay, means controlled by the operation of said series relay for operating said last means at the completion of the second series of digital impulses, a circuit completed by the operation of said second relay and said reoperated counting relays for extending a connection to said outgoing trunk circuit.

9. In a register relay circuit, a first group of counting relays for registering unit digits, a second group of counting relays for registering tens digits, a group of switching relays, a first means for transmitting two series of digital impulses, the number of impulses in said first series of digital impulses being greater than the number of counting relays in said first group, the number of impulses in said second series of digital impulses being equal to or less than the number of counting relays in said first group, a second means controlled by said first means for operating said switching relays seriatim, means whereby said second means is operated in response to the receipt of the digital impulses, a pulsing circuit controlled by said switching relays for operating all said first group and successive ones of said second group of counting relays sequentially, means whereby said pulsing circuit is controlled by said first means in response to the receipt of the first series of digital impulses, a first relay, means for operating said first relay, means whereby said last means is operated at the completion of the first series of digital impulses, a locking circuit completed by the operation of said first relay for locking the last operated counting relay in said second group, means whereby said pulsing circuit is controlled by said first means and by said switching relays in response to the receipt of the second series of digital impulses to reoperate said first group of counting relays sequentially, and a circuit included within said second means for locking said last reoperated counting relay in said first group.

10. In a register relay circuit, a first group of counting relays for registering units digits, a second group of counting relays for registering tens digits, a group of switching relays, a first means for transmitting two series of digital impulses, a second means for operating said switching relays seriatim, means whereby said second means is controlled by said first means in response to the receipt of digital impulses, a pulsing circuit operated by said first means and controlled sequentially by said switching relays, means whereby said pulsing circuit is controlled by said first means in accordance with the first series of impulses to energize the counting relays of both groups up to and including a selected tens counting relay, means whereby said pulsing circuit is reoperated to reoperate only the counting relays of said first group up to and including a selected units counting relay in accordance with the second series of digital impulses, a first relay, means for operating said first relay, means whereby said last means is operated at the completion of said first series of digital impulses, circuits controlled by said operated first relay for locking said selected tens counting relay and for opening the pulsing circuit to said second group of counting relays, and a locking circuit for locking said selected units counting relay independently of said second group of counting relays.

11. In a register relay circuit, a first group of counting relays for registering units digits, a second group of counting relays for registering tens digits, a group of switching relays, a first means for transmitting two series of digital impulses, a second means for operating said switching relays seriatim, means whereby said second means is controlled by said first means, in response to the receipt of digital impulses, a pulsing circuit, means whereby said circuit is controlled by said first means in accordance with the first series of digital impulses and controlled sequentially by said switching relays, means whereby said pulsing circuit operates said units and tens counting relays in turn up to and including a selected tens counting relay, means whereby said pulsing circuit reoperates said units counting relays up to and including a selected units counting relay in response to the receipt of the second series of digital impulses, a first relay, means for operating said first relay, means whereby said last means is operated at the completion of said first series of digital impulses, a circuit for locking said first relay operated, circuits controlled by the operation of said first relay for locking said selected tens counting relay, for releasing any operated switching relay, for opening said pulsing circuit to said tens counting relays to enable said pulsing circuit to reoperate only said units counting relays, and a circuit independent of said tens counting relays for locking said selected units counting relay.

12. In a telephone system, a plurality of outgoing switching circuits, a first group of counting relays for registering units digits, a second group of counting relays for registering tens digits, a group of switching relays, a first means for transmitting two series of digital impulses, a second means for operating said switching relays seriatim, means whereby said second means is controlled by said first means in response to the receipt of digital impulses, a pulsing circuit controlled by said switching relays, means whereby said pulsing circuit operates said units and tens relays in turn and ending with a selected tens counting relay in response to the receipt of the first series of digital impulses, means whereby said pulsing circuit reoperates said units relays ending with operation of a selected units counting relay in response to the receipt of the second series of digital impulses, a first relay, means for operating and means for locking said first relay at the completion of said first series of digital impulses, circuits controlled by said operated first relay for locking said selected tens counting relay, for releasing any operated switching relay, and for opening said pulsing circuit to enable said pulsing circuit to operate only said units counting relays, a circuit controlled by said selected units counting relay for operating one of said switching relays and said selected units counting relay in series for holding said selected units counting relay operated, a second relay, means for operating said second relay, means whereby said last means is operated at the completion of said second series of digital impulses, a circuit extending a connection to one of said outgoing switching circuits, and means controlled by the operation of said second relay for completing said last circuit through the contacts of said operated second relay, said selected tens counting relay and said selected units counting relay.

JOHN H. VOSS.

References Cited in the file of this patent

UNITED STATES PATENTS

| Number | Name | Date |
|---|---|---|
| 1,515,674 | Goodrum | Nov. 18, 1924 |
| 1,553,317 | Hinrichsen | Sept. 15, 1925 |
| 1,747,224 | Carpenter | Feb. 18, 1930 |
| 1,872,558 | Bellamy | Aug. 16, 1932 |
| 2,370,335 | Wallace | Feb. 27, 1945 |